Oct. 4, 1927.　　　　　　　　　　　　　　　　1,644,063
R. N. KIRCHER
MEANS FOR SUPPORTING KETTLE BAILS
Filed April 13, 1927　　　2 Sheets-Sheet 1

INVENTOR.
RALPH N. KIRCHER,
BY
ATTORNEYS.

WITNESS:

Oct. 4, 1927.
R. N. KIRCHER
1,644,063
MEANS FOR SUPPORTING KETTLE BAILS
Filed April 13, 1927      2 Sheets-Sheet 2
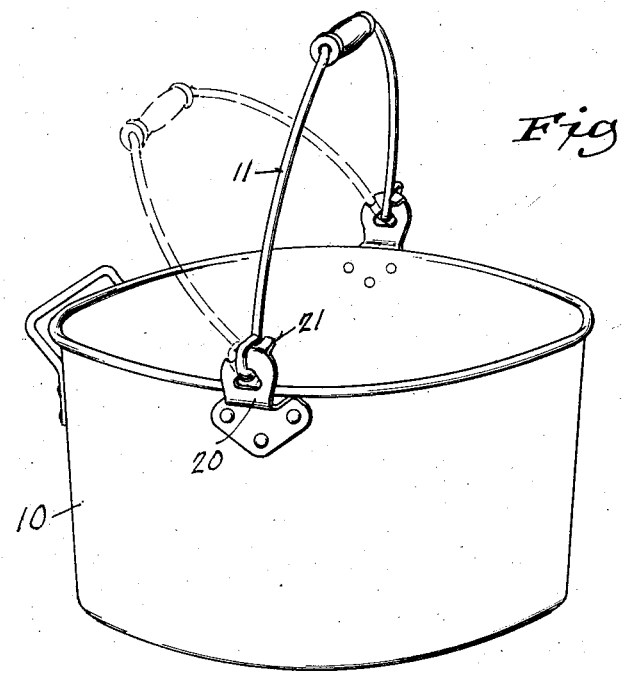
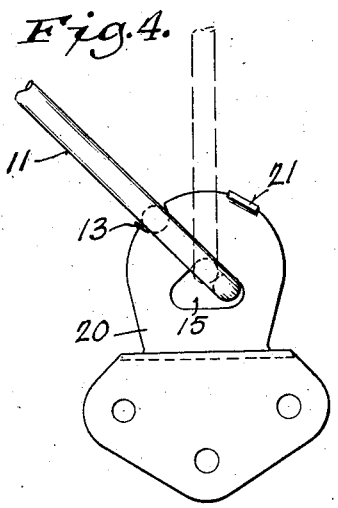
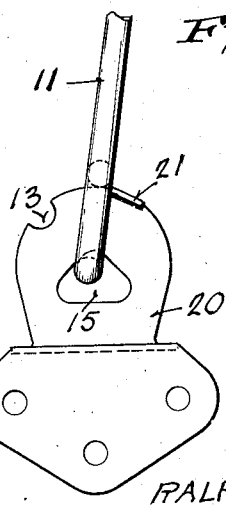
INVENTOR.
RALPH. N. KIRCHER,
BY
ATTORNEYS.

Patented Oct. 4, 1927.

1,644,063

UNITED STATES PATENT OFFICE.

RALPH N. KIRCHER, OF WEST BEND, WISCONSIN, ASSIGNOR TO WEST BEND ALUMINUM COMPANY, OF WEST BEND, WISCONSIN, A CORPORATION OF WISCONSIN.

MEANS FOR SUPPORTING KETTLE BAILS.

Application filed April 13, 1927. Serial No. 183,547.

This invention relates to an improvement in the construction of the ears which are attached to kettles, and resides in the peculiar formation of the ear, whereby the bail of the kettle, when released, automatically assumes an inclined position, with its handle clear of the kettle. In such position of the bail, the handle thereof is above the zone of the heat, and therefore remains at all times at a low temperature, so that the handle may be grasped and the kettle lifted without discomfort to the person doing so.

This self-positioning of the bail when released, is entirely automatic, and the present construction eliminates any operative movement to place the bail in the angular position in which it will not be subject to the action of heat.

The specific features of the invention will now be described, and the novelty thereof pointed out in the appended claims.

In the accompanying drawings:

Fig. 3 is a perspective view of a kettle having applied thereto a modified form of the invention, but illustrating the dominant principle thereof.

Figs. 4 and 5 are enlarged views of one of the ears of the kettle, illustrating the manner of co-operation of the bail therewith.

Figure 1:
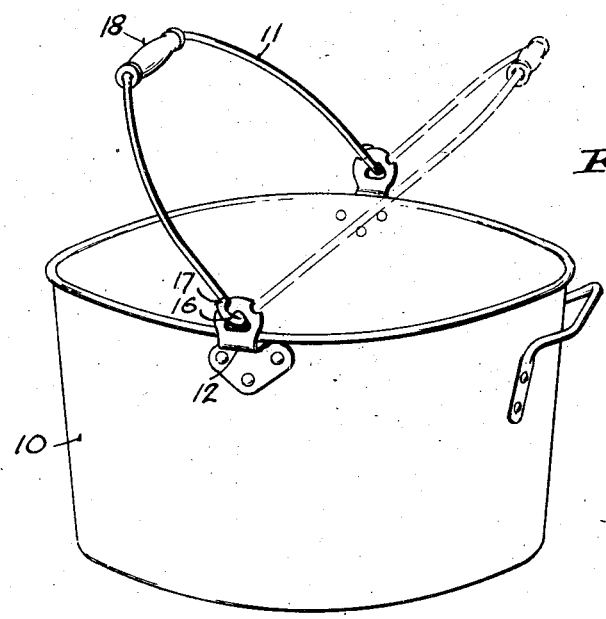
Figure 1 is a perspective view of a kettle showing my invention in its preferred form applied thereto and illustrating also the manner of its operation.

In the drawings, Fig. 1, the numeral 10 indicates a kettle of ordinary construction, provided with a usual bail 11, engaging and lifting the kettle through opposite attached ears of like formation, one of which is indicated by the numeral 12.

Figure 2:
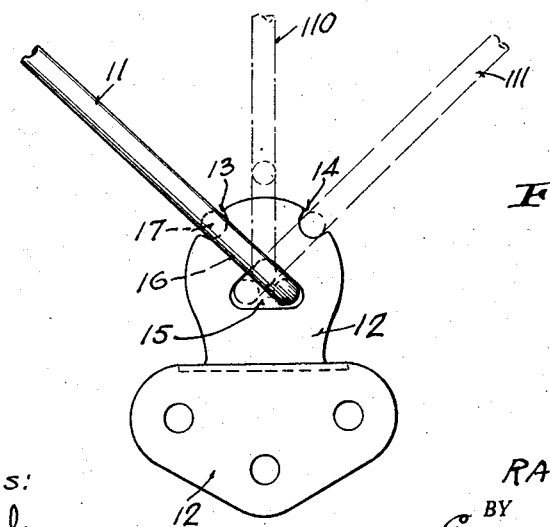
Fig. 2 is an enlarged view of one of the kettle ears of the preferred form, and illustrating, among other features, the automatic action of the bail.

In Fig. 2, the upper edge of the ear 12 is preferably arcuate, and is provided with two transverse notches 13 and 14, spaced approximately 90° apart. The ear is provided with a transverse perforation 15, located between and at some distance below the notches 13 and 14. The said perforation is shown in what is approximately an equilateral triangle, with the side walls of the opening extending from the base to the apex thereof in line with the notches 13 and 14. The greater clearance at the bottom of the triangular opening contributes to the automatic operation to which I have previously referred, as will be later described in detail.

The bail 11 is provided at its ends with loops 16, the wire forming the bail being bent laterally and passed through the perforation 15 in the ear 12, again bent to lie in parallelism, with the extreme end returned as at 17, it may be in the manner shown in Figs. 1 and 2. The parallel portions of the bail in the loop formation are adapted to move freely with the arcuate portion of the ear between them, and the return 17 of the free end referred to is adapted to be positioned in one or the other of the transverse notches 13 and 14 in the ear. The lateral bend of the bail at the bottom of the loop is adapted to engage one or the other of the inclined converging side walls of the perforation 15, that is, that side wall which is aligned with the notch in which the return 17 of the bail is seated at the time.

When the kettle is lifted, the bail assumes a vertical position, indicated by the numeral 110, and as shown by dotted lines in Fig. 2, at such time the bend at the bottom of the bail engaging the triangular opening at the point of convergence of the inclined side walls thereof. The distance between the bend at the bottom of the loop and the return 17 of the loop is a little greater than the radius of the arcuate upper side of the ear, so that the return 17 may have free movement over the arcuate surface. When the kettle is seated or rested, and the bail relaxed, the latter falls by gravity and the return 17 of the bail wire rests momentarily upon the upper arcuate edge of the ear 12, and pivots thereon. As the bail falls from its vertical position, the bend at the lower end thereof floats into engagement with one of the converging side walls of the perforation 15, which latter acts as a stop, and becomes the pivoting point in the further movement of the bail. The return 17 slides over the arcuate surface of the ear between the notches 13 and 14, until such return is opposite one of the said notches. Thereupon, gravity will cause the return 17 to be seated in the notch, and the bail to be supported in an angular position, with the handle 18 out of the zone of the heat. The bail 11 is shown at the left in Fig. 2 as supported in the notch 13, the position at the right with the bail supported in the notch 14 being indicated 111, and shown in dotted lines.

The operation is wholly automatic, and is performed instantly upon resting the kettle and relaxing the lifting pressure. The instant that the lifting pressure upon the bail is relaxed, and the bail drops, the bail at the lower end of the loop is freed from contact with the ear at the converging point of the inclined sides of the opening.

In Figs. 3, 4 and 5, I have shown a slightly different construction of ear, in which the automatic operation hereinbefore described takes place at one side only of the kettle. The construction of the ear 20 is the same as before, except that the notch 14 is omitted, and is replaced by a laterally extending stop 21, which acts positively to arrest the movement of the bail 11 to one side of the kettle, the said stop projecting into the path of the movement of the bail toward that side of the kettle. The provision of the triangular perforation 15 and the notch 13 in the ear 20, permits the automatic positioning of the bail in the same manner, while the stops 21 on the ears 20 will serve to hold the bail in a near vertical position, when thrown a little bit to one side of center. This arrangement is a convenience in some uses of the invention.

In both forms of the invention, while pouring from the kettle, the latter pivots freely upon the bend at the end of the loops in the bail, on either side in Fig. 1, and on that side away from the stops 21, in Fig. 2. When the kettle is not in use, the bail may be placed in a horizontal position, by supporting the returns 17 clear of the notches as the bail is lowered.

While I have particularly described the notches 13 and 14, the arcuate portion of the ear intermediate them, may be lowered so as to present shoulders, which will function as arresters for the bail, just as do the notches, and this construction I regard as within the scope of the claims in which the notch formation is set forth.

Having thus described my invention, what I claim and desire to secure by Letters Patent of the United States, is:

1. The combination of a kettle, ears attached to opposite sides thereof, and a bail engaging the said ears, each said ear being transversely notched at its upper edge and provided with a lower polygonal perforation one side wall of which latter extends angularly from the bottom thereof in alignment with the said notch, to support the bail in inclined position by engagement of portions of the bail with the perforations and the notches.

2. The combination of a kettle, opposite ears attached thereto, a bail engaged at its ends with the said ears, each said ear having spaced notches in its upper edge, and a lower approximately triangular perforation, the side walls of which leading from the base to the apex are aligned with the said notches, either side wall and its aligned notch serving to support the bail in inclined position by engagement of portions of the bail with the perforations and the notches.

3. The combination of a kettle, perforated ears attached to opposite sides thereof, a bail with loops at its ends engaging such perforations, each said ear having spaced notches on its upper edge with the said perforation below the same, and each perforation formed with inclined converging sides aligned with the said notches, a lower portion of the loop being adapted to engage one of the inclined sides, and an upper portion of the loop adapted to engage the notch aligned therewith, to support the bail in inclined position.

4. The combination of a kettle, opposite ears attached thereto, and a bail engaging the said ears, each said ear having spaced notches in its upper edge and a lower perforation of approximate triangular shape, the converging side walls of the perforation being substantially aligned with the said notches and forming pivotal points for the bail as the latter swings from its vertical position into engagement with the said notches, to support the bail in inclined position.

In testimony whereof, I have signed my name at West Bend, Wisconsin, this 8th day of April, 1927.

RALPH N. KIRCHER.